United States Patent Office 3,367,826
Patented Feb. 6, 1968

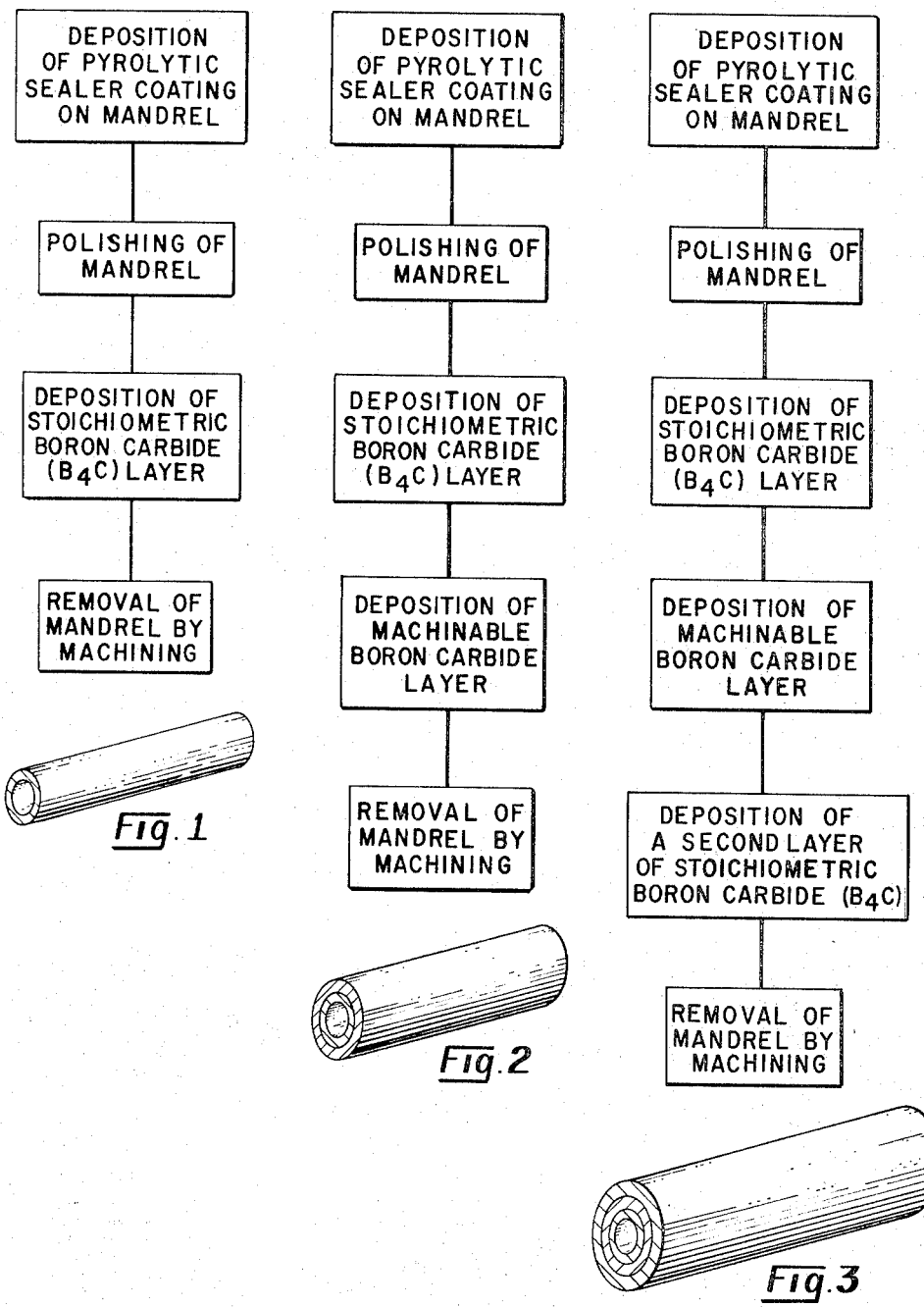

3,367,826
BORON CARBIDE ARTICLE AND
METHOD OF MAKING
Richard L. Heestand and Carl F. Leitten, Jr., Oak Ridge, Tenn., assignors to the United States of America as represented by the United States Atomic Energy Commission
Filed May 1, 1964, Ser. No. 364,342
4 Claims. (Cl. 161—182)

ABSTRACT OF THE DISCLOSURE

Stoichiometric boron carbide deposits are prepared by reacting a gaseous mixture of hydrocarbon, hydrogen, and a boron halide at a temperature of 1300° C. Included is a boron carbide article comprising alternating stratified layers of hard, dense, stoichiometric boron carbide and a machinable low boron content boron carbide.

---

The present invention relates, generally, to thermochemical deposition processes and more particularly to a method for preparing boron carbide articles having a selected, controlled composition by such processes.

Numerous vapor deposition methods have been devised for depositing selected materials, such as refractory compounds, onto various shaped supports. In general, such methods utilize a chemical interaction of gaseous compounds at a heated surface to form the desired solid deposit. Potentially, such a process has the advantage of fabricating refractory compounds which are of high density and purity and which require minimum finishing after deposition. Further, the deposition temperatures, normally, are low in comparison to the temperature required for sintering of refractory compounds, and thus, relatively inexpensive equipment can be employed. Boron carbide, combining the high thermal neutron capture cross section of boron with the extremely high hardness and density of the carbide, has good potential in certain nuclear and industrial applications, such as high temperature bearing materials and neutron-absorbing rods for nuclear reactors, to name only two. As used herein the term "boron carbide" means a solid solution containing boron and carbon wherein the concentration of boron is in the range of 20 to 80 wt. percent. Further, the term "stoichiometric boron carbide ($B_4C$)" means a boron carbide composition having 78.3 wt. percent boron.

While $B_4C$ is quite readily suitable for such uses there are certain problems associated with the fabrication of such articles into the shapes desired. In the case of high temperature bearings, powder sintering techniques have not been too suitable for making such bearings, due to the requirement that the bearing surface be extremely hard and dense; thus making any appreciable machining to final size extremely difficult. This is believed to be partly due to the difficulty experienced in controlling the density of the powder compact as well as its composition. Thus, it may be seen that where extremely close tolerances of the finished article is mandatory such processes have left much to be desired.

It is, therefore, an object of the present invention to provide a method for preparing by thermochemical deposition techniques boron carbide articles which require minimum finishing of the product.

Another object is to provide a method for preparing by thermochemical deposition techniques boron carbide articles having a selected, controlled composition gradient across its thickness.

Still another object is to provide a novel stoichiometric boron carbide article having an outer layer of machinable boron carbide disposed thereabout.

Other objects and advantages of the present invention, which will be apparent to those skilled in the art, are accomplished by providing a method for making boron carbide articles which comprises the steps of heating a surface to an elevated temperature, contacting the heated surface with a reacting gaseous mixture of a boron halide, a hydrocarbon, and hydrogen and thereafter removing the surface.

Applicants have found that a novel boron carbide article having a controlled composition ranging from 20 to 80 wt. percent boron (78.3 wt. percent boron being essentially stoichiometric $B_4C$) could be fabricated. Such articles have the advantage over prior art produced articles in that the article has a stoichiometric $B_4C$ bearing surface (hardness greater than 9 on Moh's scale, diamond rated 10) and a second surface which may be machined to a desired shape and size. In this respect it will be appreciated that the "hardness profile" for the various compositions of the boron carbide deposits obtains a maximum at approximately 78 wt. percent boron, i.e., stoichiometric boron carbide ($B_4C$), and to obtain a boron carbide deposit which is readily machinable it is necessary to go below a boron content of approximately 60 wt. percent, preferably below 50 wt. percent.

The invention will be more fully understood by reference to the following description in the appended drawing in which:

FIG. 1 is a flow sheet showing the preparation of a stoichiometric boron carbide ($B_4C$) tubular element;

FIG. 2 is a flow sheet showing the preparation of a tubular element comprising an inner layer of stoichiometric boron carbide ($B_4C$) and an outer layer of machinable boron carbide; and FIG. 3 is a flow sheet showing the preparation of a tubular element in which a machinable boron carbide layer is sandwiched between two stoichiometric boron carbide layers.

In a preferred form of the invention, a boron halide, a hydrocarbon, and hydrogen are caused to react at a suitably heated surface to form boron carbide. It has been found that a ratio of hydrocarbon to boron halide of 1–2 to 1 and a ratio of hydrogen to boron halide of 20–40 to 1 at a temperature of 1250° to 1300° C. will yield an essentially stoichiometric deposit of $B_4C$. It further has been found that by altering the reaction conditions, such as by increasing the reaction temperature or reducing the hydrogen flow, a reduction in the boron content of the deposit may be provided. Thus, when the desired thickness of stoichiometric $B_4C$ has been deposited, the reaction conditions may then be altered to deposit on the heated surface a layer of boron carbide having a composition which is softer and which may be subsequently machined to a desired size and shape. If desired, a zone having an intermediate composition may be deposited on top of the $B_4C$ layer before deposition of the machinable layer.

Preliminary to the actual deposition step, the heated surface, as for example a resistance-heated graphite mandrel, may be pre-treated to seal the surface of the mandrel and to enhance subsequent removal of the carbide deposit. For this, the mandrel is first heated to a temperature of about 1400° C. and a hydrocarbon gas, such as methane, is admitted to the system for a short period of time to pre-coat the mandrel with pyrolytic graphite. Following this, the methane flow is stopped and the temperature of the mandrel adjusted to the desired level. In passing it should be noted that in the case of a resistance-heated graphite mandrel the power input to the mandrel, which acts as an electrode, was continuously changed during the deposition to compensate for temperature decrease due to buildup of the deposit.

Applicants have found the use of hydrogen as one of the reactants to be critical to the practice of this invention. Previously, boron carbide deposits have been produced by reacting a boron halide and a hydrocarbon, such as methane, at various temperatures, as for example, temperatures above 1800° C.; however, these boron carbide deposits had low boron content, as for example around 5 wt. percent boron when these gases were reacted at 1800° C. This is to be contrasted to applicants' discovery that boron carbide deposits having high boron concentrations, starting with about 20 wt. percent boron and running as high as about 81 wt. percent boron, could be produced at much lower temperatures when hydrogen was used as one of the gaseous reactants. As mentioned before variations in the hydrogen flow rate have been found to greatly effect the boron concentration in the deposit. As for example, under constant conditions of temperature (1325° C.), pressure (35 mm.), and flow rates of boron trichloride (30 cm.$^3$/min.) and methane (80 cm.$^3$/min.), the composition of boron in the deposit varied from 44 to 65 wt. percent boron as the hydrogen flow rate increased from 1000 to 2960 cm.$^3$/min. Also under the same conditions, except a flow rate of methane (50 cm.$^3$/min.), the boron composition varied from 37 to 72 wt. percent boron as the hydrogen flow rate increased from 500 to 2200 cm.$^3$/min.

It also has been found that the temperature of the heated surface strongly influences the boron content of the deposit. For example, lowering the temperature from 1325° to 1275° C. resulted in an increase from 72 to 82 wt. percent boron with other conditions being constant. While in the other direction an increase in temperature from 1300° C. to 1400° C. was found to change the composition of the boron carbide deposit from 80 to 50 wt. percent boron.

It will be appreciated that other system variables, such as pressure, are not critical to the practice of the invention, except, as will be understood, that the rates of reaction and the overall kinetics of the system favor a low pressure system and as a result the deposition process is more efficient and the product is more dense at lower pressures. Furthermore, it has been found that, as pressure increases, it effects the uniformity of the deposit. Hence, a system pressure ranging from about 10 to 40 mm. has been found to be quite suitable.

Respecting the other reacting gases, it will be apparent to those skilled in the art that any boron-containing gas such as a boron halide and a hydrocarbon gas may be used. Inasmuch as boron trichloride has a high vapor pressure at room temperature, applicants prefer it as the boron-containing gas. Any of the saturated or unsaturated hydrocarbon gases may be used; however, inasmuch as the dissociation characteristics of the gases become more complex as one goes from the simpler saturated hydrocarbons, such as methane, to the more complex, structural wise, unsaturated hydrocarbons, such as the acetylenes, applicants prefer the saturated hydrocarbons, especially methane.

Further illustration of the quantitative aspects and procedures of the present invention is provided in the following examples. Example I illustrates the basic techniques and procedures for preparing a boron carbide article and further demonstrates the effect of system variables on the boron concentration.

*Example I*

Several boron carbide samples were vapor deposited as follows: a resistance-heated graphite electrode (⅛" O.D. x 4" long), serving as a mandrel, was mounted in a glass deposition chamber (6" diameter x 12" long). Sources of boron trichloride, methane, and hydrogen were connected to the inlet end of the deposition chamber and means were provided at the opposite end of the chamber for removal of the gaseous reaction products and for maintaining the desired pressure within the chamber. Gas flow rates were measured by needle-type metering valves and the mandrel temperature was measured by an optical pyrometer.

The graphite mandrel was heated to a temperature of 1400° C. and methane gas admitted to the chamber at a pressure of 10 mm. and a flow rate of 50 cm.$^3$/min. for ½ hour to pre-coat the mandrel with pyrolytic graphite. After the pyrolytic deposition was completed, the mandrel was polished to a surface finish of 2 RMS (root means square of highest projection in relation to the valleys). The mandrel temperature was then adjusted to 1300° C. and the system evacuated to a pressure of 10 mm. To initiate vapor deposition the reacting gases were passed into the deposition chamber, and after the deposition had proceeded for a period of about six hours, the flow rates of the reacting gases were shut off and the mandrel cooled down and removed from the boron carbide deposit by machining. Chemical analysis of each sample was made to determine the boron and carbon compositions. The results are shown in Table I.

TABLE I

| Boron (wt. percent) | Carbon (wt. percent) | Temp., °C. | Pressure, mm. | BCl$_3$ (cm.$^3$/min.) | CH$_4$ (cm.$^3$/min.) | H$_2$ (cm.$^3$/min.) |
|---|---|---|---|---|---|---|
| 20.0 | 80.0 | 1,300 | 35 | 30 | 80 | 100 |
| 37.2 | 60.6 | 1,325 | 35 | 30 | 50 | 500 |
| 43.8 | 47.2 | 1,325 | 35 | 30 | 80 | 1,000 |
| 49.2 | 47.5 | 1,400 | 35 | 30 | 80 | 2,200 |
| 59.1 | 34.9 | 1,325 | 35 | 30 | 80 | 1,800 |
| 65.3 | 27.8 | 1,325 | 35 | 30 | 80 | 2,960 |
| 69.7 | 26.3 | 1,325 | 35 | 30 | 50 | 2,220 |
| 72.4 | 26.7 | 1,325 | 35 | 30 | 50 | 2,220 |
| 76.8 | 23.2 | 1,275 | 40 | 30 | 50 | 2,220 |
| 81.4 | 17.7 | 1,275 | 20 | 20 | 50 | 2,220 |
| 81.1 | 18.2 | 1,200 | 10 | 10 | 50 | 1,400 |

Example II illustrates the preparation of a high temperature journal bearing which has one surface (inner) essentially stoichiometric boron carbide (B$_4$C) and a second surface having a composition of approximately 50 wt. percent boron.

*Example II*

The same equipment and procedure employed in Example I were used to prepare a boron carbide journal bearing. Gas reactant flow rates of 80, 30, and 3000 cm.$^3$/min. for methane, boron trichloride and hydrogen, respectively, were used at a system pressure of 10 mm. The graphite resistance-heated mandrel was heated to 1300° C. and after about one hour of plating the temperature of the mandrel was slowly increased to 1400° C. and maintained for an additional three hours. After deposition, the mandrel was cooled down and removed from the boron carbide deposit by machining.

Deposition at 1300° C. yielded a deposit having a highly dense surface of essentially stoichiometric boron carbide (78 wt. percent boron) and at 1400° C. gave a deposit having approximately 50 wt. percent boron. Deposition rates at 1300° C. ranged from 8–13 mils/hr. and were approximately 25 mils/hr. at 1400° C. Standard hardness tests were made on the boron carbide deposit and the stoichiometric boron carbide surface (inner) was found to have a hardness greater than 9 on Moh's scale, diamond rated 10.

Example III illustrates the preparation of a boron carbide tube of essentially stoichiometric boron carbide.

Example III

The same procedure was employed as in Example I to prepare a stoichiometric boron carbide tube (½" I.D. x 0.020" x 8" long) except a graphite tubular element was used as the depositing substrate and was heated in a high temperature resistance-type furnace. The same gas reactants and flow rates were used and the deposition was carried out by heating the mandrel to 1300° C. and passing the gaseous reactants through the system at a pressure of 10 mm. for 6 hours. After deposition, the mandrel was removed by machining. Chemical analysis showed that the tube consisted of essentially stoichiometric boron carbide (78 wt. percent boron).

Example IV demonstrates a method for preparing a boron carbide article having alternate layers of stoichiometric boron carbide ($B_4C$) and machinable boron carbide containing approximately 50 wt. percent boron.

Example IV

The same equipment and procedure employed in Example I were used, except when the stoichiometric boron carbide had been deposited the mandrel was heated immediately to 1400° C. to effect a deposition layer containing approximately 50 wt. percent boron. Thereafter, the temperature of the mandrel was lowered to 1300° C. and the deposition of a second stoichiometric layer was effected. Stoichiometric boron carbide deposits of up to 0.2 inch thick have been achieved and low boron content deposits (50 wt. percent boron) of up to 0.50" have been deposited.

From Examples III and IV it may readily be seen that this invention is not to be limited to only simple shapes, such as journal bearings, but it is to be understood that, any article which requires a hard dense surface but also must be fabricated to close tolerances, is within the scope of this invention.

It is also to be understood that the foregoing examples are merely illustrative and are not intended to limit the scope of this invention, but that the invention should be limited only by the scope of the appended claims.

What is claimed is:

1. A method for preparing a boron carbide article which comprises initially vapor-depositing at 1300° C. a first stoichiometric boron carbide composition on a heated surface to form a deposit having a desired thickness, by contacting said surface with a reaction mixture of a hydrocarbon, hydrogen and a boron halide in the ratio of 1–2 to 1 hydrocarbon to boron halide and 20–40 to 1 hydrogen to boron halide, respectively, then vapor-depositing at 1400° C. a second machinable boron carbide of a different composition and of desired thickness on said initial deposit and finally removing said surface.

2. A method for making a boron carbide article having inner and outer strata of different composition and a zone of intermediate composition therebetween which comprises initially vapor-depositing at 1300° C. a first stoichiometric boron carbide composition on a heated surface to form a deposit having a desired thickness by contacting said surface with a reaction mixture of a hydrocarbon, hydrogen and a boron halide in the ratio of 1–2 to 1 hydrocarbon to boron and 20–40 to 1 hydrogen to boron, respectively, and thereafter slowly heating said surface to a temperature of about 1400° C. to effect a transition composition of boron carbide, altering the reaction conditions and vapor-depositing a second stoichiometric boron carbide composition of desired thickness thereon and finally removing said surface.

3. The method of claim 2 wherein said heated surface is a resistance-heated graphite mandrel, said boron halide is boron trichloride and said surface is removed by machining.

4. A boron carbide article comprising alternating stratified layers of hard, dense, stoichiometric (78.3 wt. percent boron) boron carbide and a machinable boron carbide, consisting of from 50 to 60 wt. percent boron.

References Cited

UNITED STATES PATENTS

| | | | |
|---|---|---|---|
| 2,990,601 | 7/1961 | Wagner | 264—309 X |
| 3,016,598 | 1/1962 | Anderson et al. | 264—309 X |
| 3,294,880 | 12/1966 | Turkat | 264—29 |
| 2,671,735 | 3/1954 | Grisdale et al. | 117—106 |
| 2,810,664 | 10/1957 | Gentner | 117—106 |
| 2,962,388 | 11/1960 | Ruppert et al. | 117—106 |
| 3,265,519 | 8/1966 | Diefendorf | 117—106 |

MURRAY KATZ, *Primary Examiner.*